C. R. ALLEN.
FASTENING DEVICE FOR VEHICLE TOPS.
APPLICATION FILED MAR. 15, 1920.
1,416,435. Patented May 16, 1922.
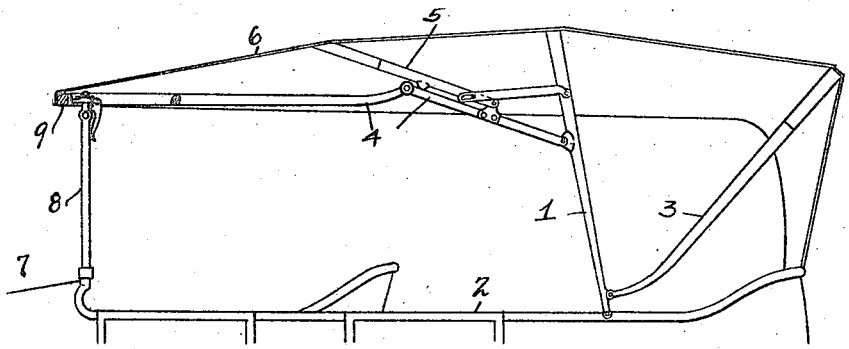
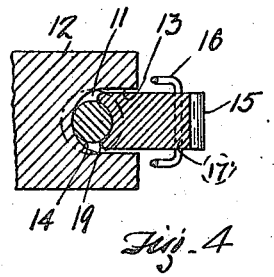
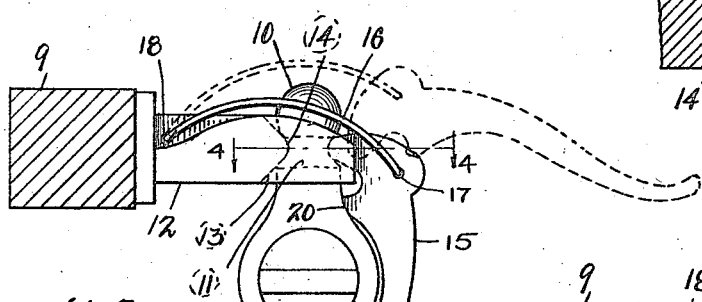
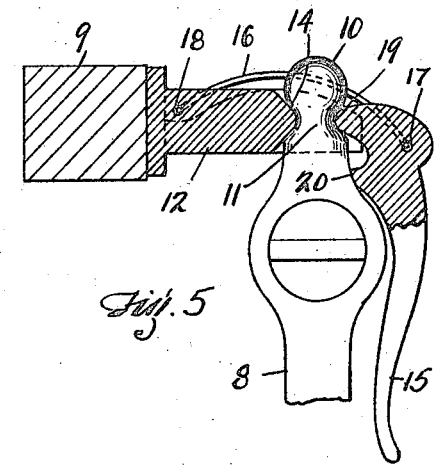
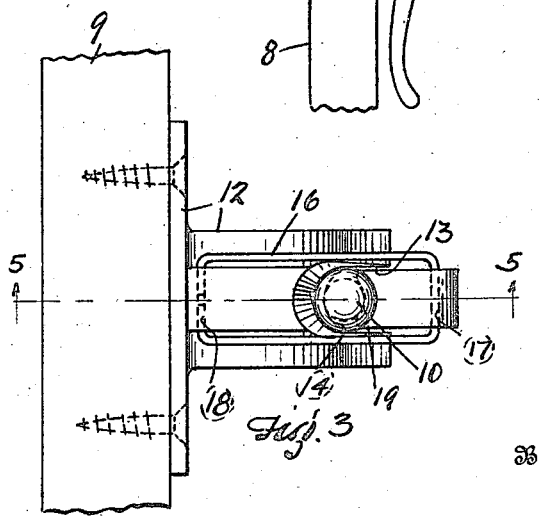
Inventor
Charles R. Allen
By Day, Oberlin & Day
Attorneys

UNITED STATES PATENT OFFICE.

CHARLES R. ALLEN, OF ASHTABULA, OHIO.

FASTENING DEVICE FOR VEHICLE TOPS.

1,416,435.    Specification of Letters Patent.    Patented May 16, 1922.

Application filed March 15, 1920. Serial No. 365,796.

*To all whom it may concern:*

Be it known that I, CHARLES R. ALLEN, a citizen of the United States, and a resident of Ashtabula, county of Ashtabula, and State of Ohio, have invented a new and useful Improvement in Fastening Devices for Vehicle Tops, of which the following is a specification, the principle of the invention being herein explained and the best mode in which I have contemplated applying that principle, so as to distinguish it from other inventions.

The present improved fastening device is more especially designed for attaching the forward or outrigger bow of an automobile top to the windshield frame, or to the special standards rising from the vehicle body, sometimes provided alongside the windshield frame proper. The object of the invention is to provide a device of the sort just described that will be simple in operation and inexpensive in its construction. In particular it is desirable that nice alignment of parts be unnecessary in order to bring the fastener into operation, as is the case with most devices of the sort at present in use.

To the accomplishment of the foregoing and related ends, the invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Fig. 1 is a side elevation of a foldable top of the kind hereinbefore referred to, shown in its extended position and partly broken away in order to illustrate the manner of mounting my improved fastening device; Fig. 2 is a side elevation, on a larger scale, of such device with adjacent portions of the top frame and windshield standard; Fig. 3 is a plan view of the same; Fig. 4 is a horizontal section taken on the plane indicated by the line 4—4, Fig. 2; and Fig. 5 is a vertical section taken on the plane indicated by the line 5—5, Fig. 3.

The construction of the top of course is a matter of indifference so far as my improved fastening device is concerned, the one illustrated in Fig. 1 being a commercial form of so-called "one man" or "clear vision" top, characterized by having a forwardly inclined main bow 1 that is pivotally attached to the vehicle body 2 adjacent to the rear seat thereof, where such body is two-seated as shown. A rearwardly inclined main bow 3 is pivotally attached to such first named main bow near the point where it is thus pivoted to the body, and a jointed outrigger bow 4, likewise pivotally attached to such first named bow, extends forwardly in a more or less horizontal direction over the front seat of the body in the open condition of the top. An intermediate bow 5 carried by such outrigger bow serves to support the top material 6 between the forward portion or outrigger bow proper and the main bow 1.

Arising from the dash or cowl 7 are two posts or standards 8 which may, as in the construction illustrated, form the side members of the windshield frame or be independent supports as desired, the upper ends of these standards being so disposed as to lie just within the transverse portion 9 of the outrigger bow 4 in such open condition of the top. The upper ends of these standards are in the form of rounded knobs 10 separated from such standards by encircling grooves 11, as clearly shown in Figs. 2 and 5. Attached to the inside of transverse bow portion 9, so as to register with each such standard, is a bracket 12 that is provided with an open recess 13 adapted to embrace the knob-like end 10 of the corresponding standard 8. The inner wall 14 of the recess is beveled to engage the encircling groove 11 below such knob when the bracket with bow 9 is drawn rearwardly.

In order to thus draw the bracket into locking engagement with the end of the standard and secure same in such position, I connect a handled lever 15 by means of a curved link 16 of resilient material with the bracket 12 near the rear end of the latter, or in other words back of the recess 13 therein. Said link 16 is conveniently formed of a loop of stiff spring wire that is passed through an aperture 17 near the upper end of the lever and then has its oppositely directed ends fitted into the aperture 18 in the bracket forming a pivot therein as aforesaid. The upper end of lever 15 has a lateral projection 19 that is beveled to engage the groove 11 at a point opposite beveled wall 14 in the recess in the bracket, the pivotal axis 17 being so located with respect to said projection 19 that the latter will lie above a line drawn through said axis and the other axis 18 of the link 16 when the fastener parts are in locking position as shown in Figs. 2 and 5. In other words, the outer end of the link 16 requires to be thrown over as the lever is swung downwardly from the dotted position shown in Fig. 2, to the full line position, said link being thus under a certain degree of tension which prevents the lever from accidentally swinging out again.

The lever is nevertheless easy of operation when it is desired to release the fastener, and thus the top, from the standard, a lug 20 being provided thereon which bears against the standard, and so leaves the lower end of the lever free to be grasped by the operator. It will be understood of course that, depending upon the conformation of the forwardly extending or outrigger bow, the fastening device may be attached to the side or other portion thereof instead of to the transverse member 9, without affecting in any way the construction or mode of operation of the device.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device for securing the forward portion of a vehicle top to the body of such vehicle, the combination of a post on said body terminating in a stud; a bracket carried by said top portion and formed to engage said stud on one side; a lever adapted to engage said stud on the opposite side; and a link connecting said lever with said bracket, substantially as described.

2. In a device for securing the forward portion of a vehicle top to the body of such vehicle, the combination of a post on said body terminating in a stud; a bracket carried by said top portion and formed to engage said stud on one side; a lever adapted to engage said stud on the opposite side; and a resilient link connecting said lever with said bracket, a line passing through the pivotal axes of said link lying below the point of engagement of said lever with said stud, in the locked condition of the device.

3. In a device for securing the forward portion of a vehicle top to the body of such vehicle, the combination of a post on said body terminating in a stud; a bracket carried by said top portion and formed with a recess adapted to receive said stud and engage the same on one side; a lever adapted to engage said stud on the opposite side; and a resilient link connecting said lever with said bracket, a line passing through the pivotal axes of said link lying below the point of engagement of said lever with said stud, in the locked condition of the device.

4. In a device for securing the forward portion of a vehicle top to the body of such vehicle, the combination of a post on said body terminating in a stud formed with an encircling groove; a bracket carried by said top portion and formed with an open recess to laterally embrace said stud and having a beveled wall adapted to engage the groove therein on one side; a lever having a projection adapted to engage such groove on the opposite side; and a curved link of resilient material connecting said lever with said bracket, a line passing through the pivotal axes of said link lying below the point of engagement of said lever with said stud, in the locked condition of the device.

Signed by me, this 11th day of March, 1920.

CHARLES R. ALLEN.